United States Patent
Matsui

(10) Patent No.: US 9,364,011 B2
(45) Date of Patent: Jun. 14, 2016

(54) METHOD FOR PRODUCING CHEESE WITHOUT FERMENTATION AND RIPENING STEPS

(76) Inventor: Sanji Matsui, Yokohama (JP)

( * ) Notice: Subject to any disclaimer, the term of this patent is extended or adjusted under 35 U.S.C. 154(b) by 183 days.

(21) Appl. No.: 13/820,373

(22) PCT Filed: Aug. 31, 2011

(86) PCT No.: PCT/JP2011/069810
§ 371 (c)(1),
(2), (4) Date: Apr. 3, 2013

(87) PCT Pub. No.: WO2012/029866
PCT Pub. Date: Mar. 8, 2012

(65) Prior Publication Data
US 2013/0189414 A1     Jul. 25, 2013

(30) Foreign Application Priority Data

Sep. 2, 2010  (JP) ................... 2010-197041
Feb. 4, 2011  (JP) ................... 2011-022698
Aug. 18, 2011 (JP) ................... 2011-179026

(51) Int. Cl.
| | |
|---|---|
| A23C 19/00 | (2006.01) |
| A23C 19/09 | (2006.01) |
| A23C 19/045 | (2006.01) |
| A23C 19/082 | (2006.01) |
| A23C 19/05 | (2006.01) |

(52) U.S. Cl.
CPC ......... *A23C 19/0921* (2013.01); *A23C 19/0455* (2013.01); *A23C 19/082* (2013.01); *A23C 19/05* (2013.01); *A23C 19/09* (2013.01)

(58) Field of Classification Search
CPC .... A23C 19/0921; A23C 19/05; A23C 19/09; A23C 19/0455; A23C 19/082
USPC .......... 428/582; 426/34, 36, 37, 39, 491, 580, 426/582
See application file for complete search history.

(56) References Cited

U.S. PATENT DOCUMENTS 4,749,584 A * 6/1988 Wirchansky et al. ......... 426/582
2010/0092609 A1  4/2010 van Dijk et al.

FOREIGN PATENT DOCUMENTS

| JP | 2-92239 A | 4/1990 |
|---|---|---|
| JP | 5-137504 A | 6/1993 |
| JP | 6-113783 A | 4/1994 |
| JP | 9-94063 A | 4/1997 |
| JP | 2004-337094 A | 12/2004 |
| JP | 2006-61066 A | 3/2006 |
| JP | 2007-222020 A | 9/2007 |
| JP | 2009-261385 A | 11/2009 |
| JP | 2010-124819 A | 6/2010 |
| WO | WO 2008/074793 A2 | 6/2008 |

OTHER PUBLICATIONS

Scott, R., Cheesemaking Practice, 1986, Elsevier Applied Science Publishers, Second Edition, pp. 168-169.*
English machine translation of JP-2004-337094-A dated Dec. 2, 2004.
English machine translation of JP-2006-61066-A dated Mar. 9, 2006.
English machine translation of JP-2007-222020-A dated Sep. 6, 2007.
English machine translation of JP-2009-261385-A dated Nov. 12, 2009.
English machine translation of JP-2010-124819-A dated Jun. 10, 2010.
English machine translation of JP-5-137504-A dated Jun. 1, 1993.
English machine translation of JP-6-113783-A dated Apr. 26, 1994.
English machine translation of JP-9-94063-A dated Apr. 8, 1997.
International Search Report issue Oct. 11, 2011, in PCT International Application No. PCT/JP2011/069810.

* cited by examiner

*Primary Examiner* — Leslie Wong
(74) *Attorney, Agent, or Firm* — Birch, Stewart, Kolasch & Birch, LLP

(57) ABSTRACT

A method for producing cheese without fermentation and ripening steps is provided. The method includes adding vinegar or acidulant to milk and mixing them. Whey is removed from the resultant mixture to recover a curd. Adding, to the curd, an emulsifier, cooking salt, sodium bicarbonate and a yeast extract and heating them to emulsify. The resultant emulsion is cooled to solidify. An alternative method includes adding to the curd a natural cheese in a ratio of 20 to 90% by weight of the curd to 80 to 10% by weight of the natural cheese. The natural cheese is selected from Grana, Mimolette, Gouda, Edam, Emmental, Gruyere, Parmigiano Reggiano cheeses, and a combination thereof. Mixing the curd and natural cheese and adding an emulsifier, cooking salt, sodium bicarbonate and yeast extract. The mixture is heated to emulsify and cooled to solidify.

19 Claims, No Drawings

METHOD FOR PRODUCING CHEESE WITHOUT FERMENTATION AND RIPENING STEPS

FIELD OF TECHNOLOGY

The present invention relates to a method for producing cheese without fermentation and ripening steps.

BACKGROUND TECHNOLOGY

Natural cheese is produced by adding a lactobacillus to milk to cause lactic fermentation and adding an enzyme rennet as a coagulant to produce a solid or curd, from which excessive water and whey are, then, removed to give a fresh product, called cheese. Alternatively, the fresh product is ripened which is also called cheese. Process cheese is produced by heat melting and mixing one or more types of cheese, followed by solidification, where the heating and melting stop the fermentation to make the product suitable for long-term storage. Process cheese contains components which are formed during the fermentation and ripening steps, for instance, aromas and deliciousness components, which give tastiness unique to cheese.

Cottage cheese is known as a kind of natural cheese. Cottage cheese is produced by adding vinegar or lemon to milk to curdle it and is called non-ripened cheese because it never receive fermentation and ripening steps. Cottage cheese has a plain taste and a little sour taste and fresh flavor because it never receive fermentation and ripening steps.

Japanese Patent Application Laid-Open No. 2009-261385 discloses a cheese flavor and/or milk taste-enhancing agent which comprises a powder seasoning having a meet-like flavor, which is produced by heating a mixture of edible plant fat and oil, and yeast extract powder, and yeast extract (claim 1). The powder seasoning having a meet-like flavor is produced by heating a powdery mixture of edible plant fat and oil and a powdery yeast extract at a temperature of 70 to 180 degrees C. for 10 to 180 minutes (claim 5). The cheese flavor and/or milk taste-enhancing agent is added in the production of cheese (claim 6).

PRIOR ART

Patent Literature

Patent Literature No. 1: Japanese Patent Application Laid-Open No. 2009-261385

SUMMARY OF THE INVENTION

Purposes of the Invention

Many equipments are needed for fermentation and ripening steps to produce process cheese. These steps make the production time long. Accordingly, a purpose of the present invention is to provide a method for producing cheese in a shorter period of time without fermentation and ripening steps, which cheese nevertheless has a flavor and texture similar to those of cheese produced through fermentation and ripening steps.

Means to Attain the Purposes

The present invention provides a method for producing cheese without fermentation and ripening steps. The method comprises steps of adding vinegar or acidulant to milk and mixing them, removing whey from the mixture to recover a solid or curd, adding, to said curd, an emulsifier, cooking salt, sodium bicarbonate and a yeast extract and heating them to emulsify, and cooling them to solidify.

Effects of the Invention

No fermentation step is needed in the present method for producing cheese, because a curd is obtained by adding vinegar or acidulant to milk. No ripening sep is needed in the present method for producing cheese, either. Accordingly, equipments for fermentation and ripening are unnecessary and maintenance costs for these equipments are saved. Further, a smaller working space is enough. It is also possible to shorten a time period for the production of cheese.

The cheese produced in the present method has a similar taste as that of cheese produced via fermentation and ripening, because a yeast extract is added in the step of emulsification.

EMBODIMENTS OF THE INVENTION

1. Preparation of a Curd

Vinegar or acidulant is added to milk and mixed, and whey is removed from a resultant mixture to obtain a solid or curd.

The milk may be cow's milk, water cow's milk, goat' milk, or sheep's milk, or a mixture thereof, preferably cow's milk.

The cow's milk may be one sterilized instantly at a super-high temperature, or one sterilized at a low temperature. Super-high temperature instantly-sterilized milk is such one as sterilized, for instance, at a temperature of 120-130 degrees C. for 2-3 seconds. Low-temperature sterilized milk is such one as sterilized at a temperature lower than the super-high temperature, for instance a temperature of 75 degrees C. for 15 seconds or such one as sterilized by being maintained at a lower temperature, for instance, 62-65 degrees C., for 30 minutes. Cow's milk may be one type out of these milk or a mixture of two or more types of these milk. Preferably, cow's milk is low-temperature sterilized milk, because super-high temperature instantly-sterilized cow's milk tends to give, after adding vinegar or acidulant, a curd which is crumbly and difficult to prepare a lump so as to need more time to prepare a lump, compared to low-temperature sterilized cow's milk.

The vinegar may be fermentation vinegar, synthesized vinegar, a seasoning comprising vinegar, or a mixture thereof. The fermentation vinegar and synthesized vinegar are edible vinegar which are listed in, for instance, the classification in the Edible Vinegar Quality Standards in the Japanese Agricultural Standards, JAS. The fermentation vinegar may be grain vinegar such as rice vinegar, black rice vinegar, black barley vinegar, and grain vinegar, fruit vinegar such as cider vinegar, grape vinegar, other fruit vinegar, and other fermentation vinegar, and a mixture thereof. The synthetic vinegar may be such one obtained by diluting glacial acetic acid or acetic acid with water, and seasoned with sugars, acidulants and taste enhancers. The seasoning comprising vinegar may be sushi vinegar, sweetened vinegar, a sauce of sake, soy and vinegar, vinegar flavored with bonito shavings, kelp, sugar and soy, ume vinegar. The vinegar may be one of these or a mixture of them. The vinegar is preferably diluted with water before used. A dilution ratio with water depends upon a concentration of acetic acid, and may be any one as long as a curd is obtained from milk.

The acidulant may be such of natural origin or such designated as a food additive, or a mixture thereof. The acidulant of natural origin may be lemon juice and ume juice. The acidulant designated as a food additive may be lactic acid, acetic acid, citric acid, or sodium salts thereof. One or two or more acidulants may used.

When vinegar or acidulant is mixed with milk, it is preferred to add the vinegar or acidulant in multiple portions, for instance, four or five portions. The vinegar or acidulant is added to milk preferably gradually under stirring.

There, milk is preferably heated at 48-52 degrees C. A mixture obtained by adding the vinegar or acidulant to milk solidifies and becomes a lump easily at this temperature.

The mixture obtained by adding the vinegar or acidulant to milk contains a curd and whey. The surd may be collected by, for instance, decanting a supernatant, i.e., whey, from the mixture or removing whey through a cheese cloth, whereby a solid is obtained in an amount to about 110 to 150 g, more specifically, 120 to 140 g, per 1,000 ml of milk.

A mixing ratio of the vinegar to milk may depend upon a concentration of acetic acid in the vinegar, and may be such that milk can be separated into a curd and whey.

The vinegar or the acidulant may be added in such an amount and a concentration that a pH of whey is 5.1 to 5.4. For instance, a mixture of 65 to 75 parts by volume of vinegar with an acetic acid concentration of about 4 to 4.5%, and 65 to 75 parts by volume of water is added to 1,000 parts by volume of milk.

Natural cheese may be used in addition to the solid, whereby it is possible to diversify taste of cheese and make efficient use of natural cheese. The natural cheese may any usual cheese, such as Grana, Mimolette, Gouda, Edam, Emmental, Gruyere, and Parmigiano Reggiano. In the present invention, natural cheese means processed cheese, too.

A mixing ratio of the solid to natural cheese is not limited to any particular value, and may be selected, depending upon a type of natural cheese and, therefore, its flavor and taste, and taste of consumers on a final product. Preferred is 20-90% by weight of the solid and 80-10% by weight of the natural cheese, more preferably 40-80% by weight of the solid and 60-20% by weight of natural cheese, further preferably more than 50% to 80% by weight of the solid and less than 20% to 20% by weight of the natural cheese. Hereinafter, the term "solid" or "curd" in relation to explanation on an amount of the components refers to the curd before mixed with natural cheese.

2. Preparation of Emulsion

In an embodiment of the invention, emulsion is obtained by adding an emulsifier, cooking salt and sodium bicarbonate, and further yeast extract to the solid, and heating them. Soy source and/or yellow coloring may be further added to the solid. When a low-temperature sterilized milk is used, skim milk may be further added to the solid. In order to attain better emulsification, the solid is cooled preferably to 40 degrees C. or below, more preferably 35 degrees C. or below, to which the these materials are then added.

The yeast extract may be a yeast extract usually used for producing bread or a mixture of more than one types of such. The yeast extract may be natural yeast. Yeast extract with a high content of nucleic acids is preferred for its taste. The yeast extract with a high content of nucleic acids contains 10% by weight or more of ribonucleic acid per weight of bacterial cell. The yeast extract with a high content of nucleic acids may be Aromild (trademark), which contains about 36% of 5-'nucleotide. A large amount of the yeast extract gives a strong taste, and a small amount of the yeast extract gives a light flavor. Accordingly, the amount may be properly increased or decreased, depending upon a type of yeast extract and a desired taste. The amount of the yeast extract to be added is, for instance, 0.3 to 0.9% by weight, preferably 0.4 to 0.8% by weight, more preferably 0.4 to 0.7% by weight, particularly 0.5 to 0.6% by weight, based on weight of the curd.

The emulsifier is not limited to any particular one and may be such used in the preparation of process cheese. The emulsifier may be, for instance, lecithin, saponin, sodium casein, glycerin fatty acid esters, sorbitan fatty acid esters, propylene glycol fatty acid esters, surose fatty acid esters, phosphoric acid salts, salts of polyphosphoric acid such as hexametaphosphoric acid salts, salts of polyphosphoric acid, and alkali metal salts of gluconic acid, or mixtures thereof. An amount of the emulsifier is not particularly limited as long as the emulsion is homogeneous. For instance, the amount may be 2.0 to 3.5% by weight, preferably 2.4 to 3.0% by weight, more preferably 2.6 to 3.0% by weight, for instance 2.7 to 2.9% by weight, based on weight of the curd.

The cooking salt may be any edible salt. An amount of the cooking salt is 1.0 to 1.5% by weight, preferably 1.1 to 1.4% by weight, more preferably 1.2 to 1.4% by weight, for instance 1.3 to 1.4% by weight, based on weight of the curd. A larger amount of the cooking salt gives too strong salty taste in a final product, which is not preferred. In a case where natural cheese is added in addition to the curd, an amount of salt contained in the natural cheese should be taken into consideration. If an amount of salt contained in the natural cheese is enough, no further salt is needed to add.

Sodium bicarbonate is used for adjusting a pH. Sodium bicarbonate can give a final product proper hardness, glutinousness, water content and acidity. An amount of sodium bicarbonate added may be adjusted so that a pH of the emulsion is about 5.8 to 5.9. The amount of sodium bicarbonate is 0.3 to 1.0% by weight, preferably 0.5 to 1.0% by weight, more preferably 0.7 to 0.9% by weight, for instance, 0.8% by weight, based on weight of the curd.

The skimmed milk is powder obtained by removing almost all water from milk from which milk fat has been removed, to be powdered. The skimmed milk gives a final product cheese proper hardness, glutinousness, water content, acidity and taste. Further, the skimmed milk offers a taste unique to the skimmed milk. The skimmed milk is preferably added when low-temperature sterilized milk is used. An amount of the skimmed milk may vary, depending upon if the milk is super-high temperature instantly-sterilized milk or low-temperature sterilized milk. In a case where the milk is super-high temperature instantly-sterilized milk, skimmed milk may not be added. In a case where the milk is super-high temperature instantly-sterilized milk, an amount of the skimmed milk may be more than zero to 1% by weight, preferably more than zero to 0.8% by weight, particularly more than zero to 0.5% by weight, based on weight of the curd. In a case where the milk is low temperature sterilized milk, an amount of the skimmed milk may be 5 to 15% by weight, preferably 8 to 15% by weight, particularly 10 to 15% by weight, for instance 12 to 13% by weight, based on weight of the curd.

It is also possible to give a final product cheese a desired hardness by controlling a ratio between high temperature sterilized milk (particularly cow's milk) and low temperature sterilized milk (particularly cow's milk) in the starting material milk. In such a case, skimmed milk is not needed to be added, but may be added. A smaller ratio of a volume of high temperature sterilized milk (X) to a volume of low temperature sterilized milk (Y), X/Y, gives softer cheese.

X/Y is preferably in a range of 4/3 to 1/4, particularly a range of 1/1 to 1/3. In a case of X/Y of 1/1, cheese is harder than commercial process cheese. In a case of X/Y of 1/2, cheese has hardness comparable to that of commercial process cheese. In a case of X/Y of 1/3, cheese is softer than commercial process cheese. Thus, a desired hardness can be obtained by adjusting X/Y.

The soy is not limited to any particular type. Together with the yeast extract, the soy gives a final product cheese, a taste similar to that of cheese produced through fermentation and ripening steps. However, addition of the yeast extract is enough to obtain the present cheese, even without addition of the soy. An amount of the soy is 0.7 to 1.4% by weight, preferably 0.8 to 1.3% by weight, particularly 0.9 to 1.3% by weight, for instance 1.2 to 1.3% by weight, based on weight of the curd. If the amount of the soy is too large, a final product cheese may have too strong soy taste, which is not preferred.

The yellow coloring is not limited to any particular one, as long as it is edible. The yellow coloring may be safflower yellow coloring, ang-khak yellow coloring, or Cape jasmine yellow coloring, or a mixture thereof, particularly red rose yellow coloring. If a color other than a usual cheese color is desired, any other coloring may be used. An amount of the yellow coloring is not particularly limited and may be such that a color of a final product cheese has a color similar to that of usual process cheese. The amount of the yellow coloring may be increased or decreased, depending upon color strength of a raw material yellow coloring.

In the method of the present invention, a sweetener such as sucrose, sorbitol and aspartame, a stabilizer such as xanthan gum, locust bean gum, pectin and carrageenan, a pH adjuster such as lactic acid, and flavors may be added to the curd.

A microwave oven may be used for the heating. In a case where an microwave oven is used in the emulsification, there is a large difference in temperature between an upper part and a lower part of the oven space. Accordingly, it is better to take the material out four or five times and mixing the material so as to keep a temperature of the material uniform around 80 degrees C. so that boiling over is avoided.

Alternatively, a jacketed kettle may be used for the heating. Direct blowing of steam into the mixture is less preferred, because positional difference in a water content might occur in the emulsion, which results in non-uniform viscosity, which is not preferred.

The heating is done at 65 to 85 degrees C., preferably 80 to 85 degrees C., more preferably 83 to 85 degrees C. From a point of view of preservation, the heating at 65 to 85 degrees C. is effective. From a point of view of emulsification, the heating at 83 to 85 degrees C. is preferred. By keeping the emulsion at this temperature, perfect emulsification is attained together with the sterilization of the emulsion.

3. Solidification of the Emulsion

While being kept at a high temperature, 80 degrees C., the emulsion is put in a mold, and solidified at ambient temperature or under cold storage around 4 to 10 degrees C. a solidified one is a final product, cheese. Because the emulsion is put into a mold at the high temperature, moldability is good. Preservation property is also good, because the emulsion is put into a mold at the high temperature.

A water content of the final product is preferably about 42 to 46% by weight, more preferably about 45% by weight.

The final product may be subjected to conventional fumigation to obtain smoked cheese, which has smoke taste comparable to or better than that of commercial smoked cheese.

The final product has a taste and mouth sensation such as glutinousness, resilience and body, similar to those of process cheese prepare through fermentation and ripening steps. A reason why the final product has a taste similar to that of process cheese prepared through fermentation and ripening steps is mainly the addition of the yeast extract. Further, another reason why the final product has a taste similar to that of process cheese prepared through fermentation and ripening steps is the emulsification with the yeast extract, the emulsifier, the salt, and sodium bicarbonate, and also that the yeast disjoins and joins (converts into glue) proteins and fats contained in the curd. The mouth sensation such as glutinousness, resilience and body may be changed stronger or weaker than that of process cheese prepare through fermentation and ripening steps as desired, by changing the ratio of a volume of high temperature sterilized milk (X) to a volume of low temperature sterilized milk (Y), X/Y.

The final product was possible to be stored for about six months in cold storage conditions, about 4 to 10 degrees C.

Example 1

Preparation of Cheese, Using Super-High Temperature Instantly-Sterilized Milk 1,000 ml of super-high temperature instantly-sterilized milk (MEGMILK, ex Nippon Milk Community Co.) was heated to 50 degrees C. in a water bath, to which a mixture of 65 ml of vinegar (ex Mitsukan Co.) and 65 ml of water was then added in four or five portions while slowly mixing with a spatula, where a pH was about 5.1 to 5.4. As a result, crumbly solid occurred. The reason why it was crumbly is thought as that protein in the super-high temperature instantly-sterilized milk had been degraded due to the high temperature. Then the mixture was further heated to 65 degrees C.

Then, the mixture of the curd and whey was poured to gauze to remove the whey, and retain the curd. The curd on the gauze was softly crumpled by hands in water in a bowl, and cooled to about 30 degrees C.

The cooled curd was taken out from water, and squeezed by hands to remove water, until no water dropped. 125 g of the cured was obtained.

The curd was broken into small pieces of about 1 to 3 cm square by hands and put in a wide-mouth bottle of a 500 cc volume, where the curd occupied about one third of the volume of the bottle.

An emulsifier (2.0 g of JohaSE, and 1.6 g of JohaC, ex BK Giulini Japan), 1.7 g of colking salt, 0.7 g of a yeast extract (Aromild, ex Koji Co.), 1.0 g of sodium bicarbonate, 1.6 ml of soy, and 0.12 g of safflower yellow coloring (Safflower Echo Conc, ex Hodogaya Kagaku Co.) were put into the wide-mouth bottle.

The wide-mouth bottle was covered with a plastic wrap, and its content was heat melted in a home electric microwave with a power of 550 W. The wide-mouth bottle was taken out three or four times and the content was stirred by sticks in order to avoid boiling-over of the content.

It was confirmed that the content emulsified completely. The temperature of the content was about 80 degrees C. and its pH was about 5.8 to 5.9. Subsequently, the content was put in a container on which a plastic wrap was spread, and covered over with the plastic wrap. The top of the wrap was pressed by hands for deairing. Then, the container was put in a refrigerator of about 5 degrees C.

After 5 hours cooling, about 130 to 140 g of cheese was obtained, hereinafter called "Cheese of Example 1". Color of the produced cheese was similar to that of usual natural cheese. The water content was about 45% by weight.

Time required for the preparation of cheese of Example 1 was about 7 hours.

(Sensory Tests)

The cheese of Example 1 was cut into a thickness of about 3 mm. Commercial process cheese having a size of 45×100×

20 mm, Snow Brand Process Cheese Type 100, ex Snow Brand Milk Products Co. Ltd., was cut into a thickness of about 3 mm to be used as a comparative sample.

Five panelists ate the cheese of Example 1 and the commercial cheese to compare their taste and mouth sensation, where the cheeses were identified with marks so that the cheeses were not specified by the panelists as which was which.

As the results, all of the panelists evaluated so that the cheese of Example 1 had taste and mouth sensation similar to those of the commercial cheese.

(Storage Tests)

The cheese of Example 1 was stored in a refrigerator for 6 months. After the 6 months, it was subjected to sensory tests. It was confirmed that the quality was kept.

Example 2

Preparation of Cheese, Using Low Temperature Sterilized Milk 1,000 ml of low temperature sterilized milk (ex Takanashi Milk Co.) was heated to 50 degrees C. in a water bath, to which a mixture of 70 ml of vinegar (ex Mitsukan Co.) and 70 ml of water was then added in four or five portions while slowly mixing with a spatula, where a pH was about 5.1 to 5.4. As a result, a curd in a round shape occurred. Then the mixture was further heated to 65 degrees C.

Then, the mixture of the curd and whey was poured in a strainer to remove the whey, and retain the curd. The curd on the strainer was softly crumpled by hands in water in a bowl, and cooled to about 30 degrees C.

The cooled curd was taken out from water, and squeezed by hands to remove water, until no water dropped. 137 g of the cured was obtained.

The curd was broken into small pieces of about 1 to 3 cm square by hands and put in a wide-mouth bottle of a 500 cc volume, where the curd occupied about one third of the volume of the bottle.

17.3 g of skimmed milk (ex Morinaga Milk Products Co.), an emulsifier (2.1 g of JohaSE, and 1.7 g of JohaC, ex BK Giulini Japan), 1.8 g of colking salt, 0.8 g of a yeast extract (Aromild, ex Koji Co.), 1.1 g of sodium bicarbonate, 1.7 ml of soy, and 0.14 g of safflower yellow coloring (Safflower Echo Conc, ex Hodogaya Kagaku Co.) were put into the wide-mouth bottle.

The wide-mouth bottle was covered with a plastic wrap, and its content was heat melted in a home electric microwave with a power of 550 W. The wide-mouth bottle was taken out three or four times and the content was stirred by sticks in order to avoid boiling-over of the content.

It was confirmed that the content emulsified completely. The temperature of the content was about 80 degrees C. and its pH was about 5.8 to 5.9. Subsequently, the content was put in a container on which a plastic wrap was spread, and covered over with the plastic wrap. The top of the wrap was pressed by hands for deairing. Then, the container was put in a refrigerator of about 5 degrees C.

After 5 hours cooling, about 140 to 150 g of cheese was obtained, hereinafter called "Cheese of Example 2". Color of the produced cheese was similar to that of usual natural cheese. The water content was about 45% by weight.

Time required for the preparation of cheese of Example 2 was about 7 hours.

(Sensory Tests)

The cheese of Example 2 was subjected to the same sensory test as in Example 1. As the results, all of the panelists evaluated so that the cheese of Example 2 had taste and mouth sensation similar to those of the commercial cheese.

(Storage Tests)

The cheese of Example 2 was stored in a refrigerator for 6 months. After the 6 months, it was subjected to sensory tests as in Example 1. It was confirmed that the quality was kept.

Example 3

Cheese was prepared according to the procedures of Example 2, except that no soy was added to a curd. As the results, all of the panelists evaluated so that the cheese of Example 3 had taste and mouth sensation comparable with those of the commercial process cheese. However, two of the panelists evaluated so that the cheese of Example 3 was somewhat inferior in taste to the cheese of Example 2.

Comparative Example 1

Cheese was prepared according to the procedures of Example 1, except that no yeast extract was added. The obtained cheese was inferior in taste and mouth sensation to the commercial process cheese, Snow Brand Process Cheese Type 100, and also inferior in taste and mouth sensation to the cheese of Example 1.

Comparative Example 2

Cheese was prepared according to the procedures of Example 2, except that no yeast extract was added. The obtained cheese was inferior in taste and mouth sensation to the commercial process cheese, Snow Brand Process Cheese Type 100, and also inferior in taste and mouth sensation to the cheese of Example 2.

Comparative Example 3

Cheese was prepared according to the procedures of Example 2, except that 0.7 g of sodium glutamate (Ajinomoto, trademark), 3 g of miso, 3 ml of soy, 3 g of cooking salt or 1.5 g of powdered soup stock were used instead of 0.8 g of the yeast extract The cheese obtained with the aforesaid materials instead of the yeast extract did not have taste or mouth sensation similar to those of cheese prepare through fermentation and ripening steps. In a case where sodium glutamate was added in a larger amount than the aforesaid amount, deliciousness was too strong. In a case where sodium glutamate was added in a smaller amount than the aforesaid amount, taste was simple and too light. In a case where the miso was added in a larger amount than the aforesaid amount, salty taste and musty smell were strong. In a case where the miso was added in a smaller amount than the aforesaid amount, taste of soy bean was felt. In a case where the soy was added in a larger amount than the aforesaid amount, salty taste was too strong. In a case where the soy was added in a smaller amount than the aforesaid amount, taste of soy bean was felt and taste was simple. In a case where cooking salt was added in a larger amount than the aforesaid amount, the product was too salty and had less deliciousness. In a case where cooking salt was added in a smaller amount than the aforesaid amount, the product had less deliciousness and simple taste. In a case where the powdered soup of stock was added in a larger amount than the aforesaid amount, smell of bonito was felt. In a case where the powdered soup of stock was added in a smaller amount than the aforesaid amount, taste was simple.

In contrast, as seen in Examples 1 and 2, the cheese had taste and mouth sensation similar to those of cheese prepared through fermentation and ripening steps, on account of the use of yeast extract (Aromild: trademark).

Comparative Example 4

Here, the procedures of Example 1 were repeated until the curd was obtained. Without cooling the curd, the skimmed milk, the emulsifier, sodium bicarbonate, the yeast extract, cooking salt, the soy and the safflower yellow color were added in the same amounts as in Example 1. As the results, the added materials became a lump, and sodium bicarbonate foamed, so that the content spilled out from the wide-mouth bottle. This could be a cause for insufficient emulsification.

Meanwhile, as seen in Examples 1 and 2, on account of the cooling of the curd to 30 degrees C. in water, the added materials did not become a lump, and insufficient emulsification did not happen.

Reference Example 1

1,000 ml of low temperature sterilized milk (ex Takanashi Milk Co.) was heated to 50 degrees C. in a water bath, in which a mixture of 70 ml of vinegar (Mitsukan Co.) and 70 ml of water was then added at once. As a result, hardness of the curd was uneven. Meanwhile, as seen in Examples 1 and 2, where the aforesaid mixture was added in several portions, hardness of the curd was even.

Reference Example 2

1,000 ml of low temperature sterilized milk (ex Takanashi Milk Co.) was heated to 50 degrees C. in a water bath, in which a mixture of 70 ml of vinegar (Mitsukan Co.) and 70 ml of water was then added in four or five portions while strongly stirring (several rounds per second). As a result, solid dispersed and did not get together.

Meanwhile, as seen in Examples 1 and 2, the slow stirring (0.5 round per second) gave a solid of a round shape.

Reference Example 3

No skimmed milk was added to a curd prepared as in Example 2. The material was too much watery and mushy, looked like a spread.

Meanwhile, as seen in Example 2, a desired consistency was attained on account of the skimmed milk used.

Example 4

Adjusted Ratio of the High Temperature Sterilized Milk and the Low Temperature Sterilized Milk 500 ml of milk sterilized at a high temperature, 130 degrees C., for 2 seconds and 500 ml of milk sterilized at a low temperature, 66 degrees C., for 30 minutes were mixed and heated to 50 degrees C. in a water bath, into which a mixture of 70 ml of vinegar (ex Mitsukan Co.) and 70 ml of water was then slowly put in four portions and stirred slowly with a spatula to cause separation into whey and a curd. The temperature of the whey in which the curd was still contained was raised to 60 degrees C. The curd was collected with a strainer and squeezed to remove the remaining whey. The curd was softly crumbled by hands in water and cooled to about 35 degrees C. About 145 g of a curd was obtained.

The cooled curd was cut into 1 to 2 cm size and put into a wide-mouth bottle of a 500 ml volume.

1.2% by weight of an emulsifier (Polyphosphoric Acid 5-A, Kirin Kyowa Foods Co.), 1.2% by weigh of cooking salt, 0.5% by weight of a yeast extract (Aromild, ex Koji Co.), 0.3% by weight of sodium bicarbonate and 0.12% by weight of safflower yellow coloring (Safflower Echo Conc, ex Hodogaya Kagaku Co.) were put in the curd in the wide-mouth bottle.

The wide-mouth bottle was covered with a plastic wrap, and its content was heat melted in a home electric microwave with a power of 550 W. The wide-mouth bottle was taken out three or four times and the content was stirred by sticks in order to avoid boiling-over of the content.

It was confirmed that the content emulsified completely. The temperature of the content was about 85 degrees C. Subsequently, the content was put in a container on which a plastic wrap was spread, and covered over with the plastic wrap. The top of the wrap was pressed by hands for deairing. Then, the container was put in a refrigerator of about 5 degrees C.

After 5 hours cooling, cheese was obtained, hereinafter called "Cheese of Example 4". This was subjected to the following sensory tests.

Example 5

Adjusted Ratio of the High Temperature Sterilized Milk and the Low Temperature Sterilized Milk 500 ml of milk sterilized at a high temperature, 130 degrees C., for 2 seconds and 500 ml of milk sterilized at a low temperature, 66 degrees C., for 30 minutes were mixed and heated to 50 degrees C. in a water bath, into which a mixture of 53 ml of vinegar (ex Mitsukan Co.) and 53 ml of water was then slowly put in four portions and stirred slowly with a spatula to cause separation into whey and a curd. After this, the same procedures as in Example 1 were followed.

The obtained cheese was called "Cheese of Example 5" and subjected to the following sensory tests.

Comparative Example 5

The procedures of Example 4 were repeated except that 1,000 ml of the milk sterilized at a low temperature, 66 degrees C., for 30 minutes was used instead of the 500 ml of milk sterilized at a high temperature, 130 degrees C., for 2 seconds and the 500 ml of milk sterilized at a low temperature, 66 degrees C., for 30 minutes used in Example 4.

The obtained cheese was called "Comparative Cheese of Example 5" and subjected to the following sensory tests.

(Sensory Tests)

Each of the cheeses was cut into a thickness of about 3 mm. Commercial process cheese (Snow Brand Baby Cheese, ex Snow Brand Milk Products Co. Ltd.) was also cut into a thickness of about 3 mm to be used as a control.

Five panelist compared hardness of the cheeses with each other, where the cheeses were identified with marks so that the cheeses were not specified by the panelists as which was which. The results are as indicated in the following Table.

| Panelist | Softest | Soft | Hard | Hardest |
|---|---|---|---|---|
| 1 | Comp. Ex. 5 | Example 5 | Commercial process cheese | Example 4 |
| 2 | Comp. Ex. 5 | Example 5 | Commercial process cheese | Example 4 |
| 3 | Comp. Ex. 5 | Commercial | Example 5 | Example 4 |

-continued

| Panelist | Softest | Soft | Hard | Hardest |
|---|---|---|---|---|
| 4 | Comp. Ex. 5 | process cheese Example 5 | Commercial process cheese | Example 4 |
| 5 | Comp. Ex. 5 | Commercial process cheese | Example 2 | Example 4 |

All of the five panelists made a note that difference between the cheese of Example 5 and the commercial process cheese was small.

Example 6

Co-Use of Natural Cheese 1,000 ml of super-high temperature instantly-sterilized milk (MEGMILK, ex Nippon Milk Community Co.) was heated to 50 degrees C. in a water bath, to which a mixture of 65 ml of vinegar (ex Mitsukan Co.) and 65 ml of water was then added in four or five portions while slowly mixing with a spatula, where a pH was about 5.1 to 5.4. As a result, crumbly solid occurred. The reason why it was crumbly is thought as that protein in the super-high temperature instantly-sterilized milk had been degraded due to the high temperature. Then the mixture was further heated to 65 degrees C.

Then, the mixture of the curd and whey was poured to gauze to remove the whey, and retain the curd. The curd on the gauze was softly crumpled by hands in water in a bowl, and cooled to about 30 degrees C.

The cooled curd was taken out from water, and squeezed by hands to remove water, until no water dropped. 125 g of the cured was obtained.

70 Parts by weight of the curd obtained above were cut by a kitchen knife. 30 Parts by weight of ripened Grana cheese made in Italy were pulverized. To 100 parts by weight of a mixture of these two cheeses, added were an emulsifier (1.2 parts by weight of JohaSE, and 1.0 part by weight of JohaC, ex BK Giulini Japan), 0.4 part by weight of a yeast extract (Aromild, ex Koji Co.), 0.6 part by weight of sodium bicarbonate, and 0.6 part by weight of safflower yellow coloring (Safflower Echo Conc, ex Hodogaya Kagaku Co.).

The mixture was heated to 85 degrees C. to emulsify wholly, poured into a mold, cooled to 5 degrees C. to obtain cheese. The obtained cheese had color similar to that of usual cheese.

(Sensory Tests)

The cheese of Example 6 was cut into a thickness of about 3 mm. Commercial process cheese having a size of 45×100× 20 mm, Snow Brand Process Cheese Type 100, ex Snow Brand Milk Products Co. Ltd., and ripened Grana cheese made in Italy were each cut into a thickness of about 3 mm to be used as comparative samples.

Five panelists ate the cheese of Example 6, the commercial cheese and the ripened Grana cheese made in Italy to compare their taste and mouth sensation, where the cheeses were identified with marks so that the cheeses were not specified by the panelists as which was which.

As the results, three panelists evaluated so that the cheese of Example 6 had taste and mouth sensation similar to those of the commercial cheese. The remaining two panelists evaluated so that the cheese of Example 6 had more deliciousness than the commercial process cheese, and was milder and had similar mouth sensation, compared to the Grana cheese. All of the five panelists evaluated so that the cheese of Example 6 had smoother texture than the Grana cheese.

Thus, the flavor and taste of the Grana were improved.

Example 7

The procedures of Example 6 were repeated except that 20 parts by weight of Mimolette cheese was used instead of 30 parts by weight of the Grana cheese.

The Mimolette cheese itself has unique strong taste and flavor, which was mitigated in Example 7 to give a mild cheese.

Example 8

70 Parts by weight of a curd prepared as in the first half of Example 6 was cut by a knife. 30 Parts by weight of Gouda cheese was pulverized. To 100 parts by weight of a mixture of these two cheeses, added were an emulsifier (1.2 parts by weight of JohaSE, and 1.0 part by weight of JohaC, ex BK Giulini Japan), 0.4 part by weight of a yeast extract (Aromild, ex Koji Co.), 0.8 part by weight of cooking salt, 0.6 part by weight of sodium bicarbonate, and 0.07 part by weight of safflower yellow coloring (Safflower Echo Conc, ex Hodogaya Kagaku Co.).

The mixture was heated to 85 degrees C. to emulsify wholly, poured into a mold, cooled to 5 degrees C. to obtain cheese.

The Gouda cheese itself has unique strong taste and flavor, which was mitigated in Example 8 to give cheese having taste and mouth sensation similar to those of Commercial process cheese, Snow Brand Process Cheese Type 100.

The invention claimed is:

1. A method for producing cheese without fermentation and ripening steps, the method comprising steps of:
    a) adding vinegar or acidulant to milk and mixing them;
    b) removing whey from a resultant mixture to recover a curd;
    c) adding, to said curd, an emulsifier, cooking salt, sodium bicarbonate and a yeast extract;
    d) heating them to emulsify; and
    e) cooling a resultant emulsion to solidify,
    wherein the method is performed without fermentation and ripening steps.

2. The method of claim 1, wherein said emulsifier, cooking salt, sodium bicarbonate, and yeast extract are added after said curd is cooled to or below 40 degrees C.

3. The method of claim 1, wherein said yeast extract is 0.3 to 0.9% by weight, based on weight of said curd.

4. The method of claim 1, wherein said milk is cow's milk.

5. The method of claim 4, wherein said milk is low temperature sterilized cow's milk, and skimmed milk is further added to said curd and heated.

6. The method of claim 1, wherein said yeast extract is a yeast extract with a high content of nucleic acids.

7. The method of claim 1, wherein soy is further added to said curd and heated.

8. The method of claim 1, wherein the milk is high temperature sterilized milk and low temperature sterilized milk, and a desired hardness of said cheese is attained by controlling a ratio of said high temperature sterilized milk to said low temperature sterilized milk.

9. The method of claim 8, wherein a ratio of a volume of said high temperature sterilized milk (X) to a volume of said low temperature sterilized milk (Y), X/Y, is in a range of 4/3 to 1/4.

10. The method of claim 8, wherein a ratio of a volume of said high temperature sterilized milk (X) to a volume of said low temperature sterilized milk (Y), X/Y, is in a range of 1/1 to 1/3.

11. The method of claim 8, wherein a ratio of a volume of said high temperature sterilized milk (X) to a volume of said low temperature sterilized milk (Y), X/Y, is 1/2.

12. The method of claim 8, wherein said milk is cow's milk.

13. The method of claim 1, further comprising a natural cheese is used in addition to said curd in a ratio of 20 to 90% by weight of said curd to 80 to 10% by weight of said natural cheese.

14. The method of claim 13, wherein said ratio is 40 to 80% by weight of said curd to 60 to 20% by weight of said natural cheese.

15. The method of claim 13, wherein said ratio is more than 50 to 80% by weight of said curd to less than 50 to 20% by weight of said natural cheese.

16. The method of claim 13, wherein said natural cheese is selected from the group consisting of Grana, Mimolette, Gouda, Edam, Emmental, Gruyere, and Parmigiano Reggiano cheeses.

17. A method for producing cheese without fermentation and ripening steps, the method comprising steps of:
a) adding vinegar or acidulant to milk and mixing them, wherein the milk and vinegar or acidulant is heated to 48 to 52 degrees C.;
b) removing whey from a resultant mixture to recover a curd;
c) cooling the curd to or below 40 degrees C.;
d) adding to the curd a natural cheese in a ratio of 20 to 90% by weight of said curd to 80 to 10% by weight of said natural cheese, wherein said natural cheese is selected from the group consisting of Grana, Mimolette, Gouda, Edam, Emmental, Gruyere, Parmigiano Reggiano cheeses, and a combination thereof;
e) mixing said curd and natural cheese;
f) adding, to said curd and natural cheese, an emulsifier, cooking salt, sodium bicarbonate and a yeast extract;
g) heating them to emulsify; and
h) cooling a resultant emulsion to solidify,
wherein the method is performed without fermentation and ripening steps.

18. The method of claim 17, wherein said ratio of step d) is more than 50 to 80% by weight of said curd to less than 50 to 20% by weight of said natural cheese.

19. A method for producing cheese without fermentation and ripening steps, the method comprising steps of:
a) adding vinegar or acidulant to milk and mixing them, wherein the vinegar or acidulant is added at an amount and a concentration that a pH of whey is between 5.1 to 5.4, wherein the milk and vinegar or acidulant is heated to 48 to 52 degrees C.;
b) removing whey from a resultant mixture to recover a curd;
c) adding to the curd a natural cheese in a ratio of 20 to 90% by weight of said curd to 80 to 10% by weight of said natural cheese, wherein said natural cheese is selected from the group consisting of Grana, Mimolette, Gouda, Edam, Emmental, Gruyere, Parmigiano Reggiano cheeses, and a combination thereof;
d) mixing said curd and natural cheese;
e) cooling the curd and natural cheese mixture to or below 40 degrees C.;
f) adding to said curd and natural cheese mixture, an emulsifier, cooking salt, sodium bicarbonate and a yeast extract,
wherein the emulsifier is selected from the group consisting of lecithin, saponin, sodium casein, glycerin fatty acid esters, sorbitan fatty acid esters, propylene glycol fatty acid esters, surose fatty acid esters, phosphoric acid salts, salts of polyphsphoric acid, hexametaphosphoric acid salts, salts of polyphosphoric acid, alkali metal salts of gluconic acid, and mixtures thereof,
wherein the emulsifier is 2.0 to 3.5% by weight,
wherein the cooking salt is 1.0 to 1.5% by weight,
wherein the sodium bicarbonate is 0.3 to 1.0% by weight;
g) heating the mixture of step to 65 to 85 degrees C. to emulsify,
wherein the emulsion has a pH is 5.8 to 5.9; and
h) cooling a resultant emulsion to solidify,
wherein the method is performed without fermentation and ripening steps,
wherein the solidified cheese has a final water content of 42 to 46% by weight.

\* \* \* \* \*